(12) United States Patent
Arumainayagam et al.

(10) Patent No.: US 7,571,174 B2
(45) Date of Patent: Aug. 4, 2009

(54) SYSTEMS, METHODS, INTERFACES AND SOFTWARE FOR AUTOMATED COLLECTION AND INTEGRATION OF ENTITY DATA INTO ONLINE DATABASES AND PROFESSIONAL DIRECTORIES

(75) Inventors: Yohendran Arumainayagam, Stamford, CT (US); Christopher C. Dozier, Minneapolis, MN (US)

(73) Assignee: Thomson Reuters Global Resurces, Zug (CH)

( * ) Notice: Subject to any disclaimer, the term of this patent is extended or adjusted under 35 U.S.C. 154(b) by 459 days.

(21) Appl. No.: 11/028,464

(22) Filed: Jan. 3, 2005

(65) Prior Publication Data

US 2005/0234968 A1 Oct. 20, 2005

Related U.S. Application Data

(60) Provisional application No. 60/533,588, filed on Dec. 31, 2003.

(51) Int. Cl.
G06F 17/30 (2006.01)
(52) U.S. Cl. .............................. 707/101; 707/4; 707/7; 707/10
(58) Field of Classification Search ..................... 707/6, 707/102, 4, 10
See application file for complete search history.

(56) References Cited

U.S. PATENT DOCUMENTS

| 3,872,448 | A | 3/1975 | Mitchell, Jr. |
| 4,384,288 | A | 5/1983 | Walton |
| 4,575,621 | A | 3/1986 | Dreifus |
| 4,817,050 | A | 3/1989 | Komatsu et al. |
| 4,864,501 | A | 9/1989 | Kucera et al. |
| 4,878,175 | A | 10/1989 | Norden-Paul et al. |
| 4,887,212 | A | 12/1989 | Zamora et al. |
| 4,893,270 | A | 1/1990 | Beck et al. |
| 4,958,283 | A | 9/1990 | Tawara et al. |
| 4,994,966 | A | 2/1991 | Hutchins |
| 5,065,315 | A | 11/1991 | Garcia |
| 5,146,439 | A | 9/1992 | Jachmann et al. |
| 5,157,783 | A | 10/1992 | Anderson et al. |
| 5,204,947 | A | 4/1993 | Bernstein et al. |
| 5,218,697 | A | 6/1993 | Chung |

(Continued)

FOREIGN PATENT DOCUMENTS

EP 0848337 12/1996

(Continued)

OTHER PUBLICATIONS

Dozier, C., et al., "Automatic Extraction and Linking of Person Names in Legal Text." Proceedings of RIAO. Apr. 2000. pp. 1305-1321.*

(Continued)

*Primary Examiner*—Shahid A Alam
(74) *Attorney, Agent, or Firm*—Schwegman, Lundberg & Woessner, P.A.

(57) ABSTRACT

An information-retrieval system includes a server that receives queries for documents from client devices and means for outputting results of queries to the client devices, with the results provided in association with one or more interactive control features that are selectable to invoke display of information regarding entities, such as professionals, referenced in the results.

32 Claims, 9 Drawing Sheets

U.S. PATENT DOCUMENTS

| | | | |
|---|---|---|---|
| 5,233,513 A | 8/1993 | Doyle | |
| 5,253,362 A | 10/1993 | Nolan et al. | |
| 5,265,065 A | 11/1993 | Turtle | |
| 5,283,884 A | 2/1994 | Menon et al. | |
| 5,291,399 A | 3/1994 | Chaco | |
| 5,297,249 A | 3/1994 | Bernstein et al. | |
| 5,317,729 A | 5/1994 | Mukherjee et al. | |
| 5,319,711 A | 6/1994 | Servi | |
| 5,361,202 A | 11/1994 | Doue | |
| 5,361,346 A | 11/1994 | Panesar et al. | |
| 5,377,323 A | 12/1994 | Vasudevan | |
| 5,404,435 A | 4/1995 | Rosenbaum | |
| 5,408,655 A | 4/1995 | Oren et al. | |
| 5,414,838 A | 5/1995 | Kolton et al. | |
| 5,418,942 A | 5/1995 | Krawchuk et al. | |
| 5,418,948 A | 5/1995 | Turtle | |
| 5,434,932 A | 7/1995 | Scott | |
| 5,434,974 A | 7/1995 | Loucks et al. | |
| 5,438,655 A | 8/1995 | Richichi et al. | |
| 5,459,860 A | 10/1995 | Burnett et al. | |
| 5,488,725 A | 1/1996 | Turtle et al. | |
| 5,490,250 A | 2/1996 | Reschke et al. | |
| 5,497,317 A | 3/1996 | Hawkins et al. | |
| 5,506,984 A | 4/1996 | Miller | |
| 5,515,534 A | 5/1996 | Chuah et al. | |
| 5,530,852 A | 6/1996 | Meske, Jr. et al. | |
| 5,535,372 A | 7/1996 | Benhase et al. | |
| 5,541,583 A | 7/1996 | Mandelmaum | |
| 5,544,352 A | 8/1996 | Egger | |
| 5,557,539 A | 9/1996 | Fitch | |
| 5,558,638 A | 9/1996 | Evers et al. | |
| 5,560,005 A | 9/1996 | Hoover et al. | |
| 5,581,460 A | 12/1996 | Kotake et al. | |
| 5,603,025 A | 2/1997 | Tabb et al. | |
| 5,608,900 A | 3/1997 | Dockter et al. | |
| 5,617,565 A | 4/1997 | Augenbraun et al. | |
| 5,629,981 A | 5/1997 | Nerlikar | |
| 5,644,720 A | 7/1997 | Boll et al. | |
| 5,646,416 A | 7/1997 | Van de Velde | |
| 5,659,676 A | 8/1997 | Redpath | |
| 5,664,109 A * | 9/1997 | Johnson et al. | 705/2 |
| 5,708,825 A | 1/1998 | Sotomayor | |
| 5,724,595 A | 3/1998 | Gentner et al. | |
| 5,724,608 A | 3/1998 | Tohara | |
| 5,740,252 A | 4/1998 | Minor et al. | |
| 5,740,549 A | 4/1998 | Reilly et al. | |
| 5,742,181 A | 4/1998 | Rush | |
| 5,745,360 A | 4/1998 | Leone et al. | |
| 5,745,908 A | 4/1998 | Anderson et al. | |
| 5,751,961 A | 5/1998 | Smyk | |
| 5,754,857 A | 5/1998 | Gadol | |
| 5,761,436 A | 6/1998 | Nielsen | |
| 5,764,906 A | 6/1998 | Edelstein et al. | |
| 5,764,916 A | 6/1998 | Busey et al. | |
| 5,781,900 A | 7/1998 | Shoji et al. | |
| 5,794,050 A | 8/1998 | Dahlgren et al. | |
| 5,794,236 A | 8/1998 | Mehrle | |
| 5,806,079 A | 9/1998 | Rivette et al. | |
| 5,815,830 A | 9/1998 | Anthony | |
| 5,819,092 A | 10/1998 | Ferguson et al. | |
| 5,819,273 A | 10/1998 | Vora et al. | |
| 5,822,539 A | 10/1998 | van Hoff | |
| 5,822,720 A | 10/1998 | Bookman et al. | |
| 5,842,224 A | 11/1998 | Fenner | |
| 5,860,073 A | 1/1999 | Ferrel et al. | |
| 5,860,136 A | 1/1999 | Fenner | |
| 5,862,325 A | 1/1999 | Reed et al. | |
| 5,867,562 A | 2/1999 | Scherer | |
| 5,867,821 A | 2/1999 | Ballantyne et al. | |
| 5,873,077 A | 2/1999 | Kanoh et al. | |
| 5,875,446 A | 2/1999 | Brown et al. | |
| 5,878,421 A | 3/1999 | Ferrel et al. | |
| 5,884,302 A | 3/1999 | Ho | |
| 5,895,461 A | 4/1999 | De La Huerga et al. | |
| 5,903,889 A * | 5/1999 | de la Huerga et al. | 707/3 |
| 5,905,866 A | 5/1999 | Nakabayashi et al. | |
| 5,905,991 A | 5/1999 | Reynolds | |
| 5,940,843 A | 8/1999 | Zucknovich et al. | |
| 5,942,986 A | 8/1999 | Shabot et al. | |
| 5,946,682 A | 8/1999 | Wolfe | |
| 5,963,205 A | 10/1999 | Sotomayor | |
| 5,963,940 A | 10/1999 | Liddy et al. | |
| 5,963,950 A | 10/1999 | Nielsen et al. | |
| 5,970,505 A | 10/1999 | Ebrahim | |
| 5,974,413 A | 10/1999 | Beauregard et al. | |
| 5,987,454 A | 11/1999 | Hobbs | |
| 5,987,475 A | 11/1999 | Murai | |
| 6,014,662 A | 1/2000 | Moran et al. | |
| 6,014,677 A | 1/2000 | Hayashi et al. | |
| 6,025,844 A | 2/2000 | Parsons | |
| 6,026,388 A | 2/2000 | Liddy et al. | |
| 6,031,537 A | 2/2000 | Hugh | |
| 6,038,573 A | 3/2000 | Parks | |
| 6,091,412 A | 7/2000 | Simonoff et al. | |
| 6,092,074 A | 7/2000 | Rodkin et al. | |
| 6,094,649 A | 7/2000 | Bowen et al. | |
| 6,122,647 A * | 9/2000 | Horowitz et al. | 715/513 |
| 6,128,635 A | 10/2000 | Ikeno | |
| 6,141,663 A | 10/2000 | Hunkins et al. | |
| 6,151,624 A | 11/2000 | Teare et al. | |
| 6,178,434 B1 | 1/2001 | Saitoh | |
| 6,188,751 B1 | 2/2001 | Scherer | |
| 6,205,576 B1 * | 3/2001 | Rajala et al. | 717/105 |
| 6,216,141 B1 | 4/2001 | Straub et al. | |
| 6,233,591 B1 | 5/2001 | Sherman et al. | |
| 6,256,631 B1 | 7/2001 | Malcolm et al. | |
| 6,263,121 B1 | 7/2001 | Melen et al. | |
| 6,263,351 B1 * | 7/2001 | Wolfe | 715/501.1 |
| 6,272,505 B1 | 8/2001 | De La Huerga | |
| 6,308,171 B1 | 10/2001 | De La Huerga | |
| 6,341,306 B1 | 1/2002 | Rosenschein et al. | |
| 6,345,268 B1 | 2/2002 | de la Huerga | |
| 6,353,822 B1 | 3/2002 | Lieberman | |
| 6,356,922 B1 * | 3/2002 | Schilit et al. | 715/512 |
| 6,434,567 B1 | 8/2002 | De La Huerga | |
| 6,457,028 B1 | 9/2002 | Pitkow et al. | |
| 6,507,837 B1 | 1/2003 | De La Huerga | |
| 6,516,321 B1 | 2/2003 | De La Huerga | |
| 6,519,631 B1 | 2/2003 | Rosenschein et al. | |
| 6,654,758 B1 | 11/2003 | Teague | |
| 7,333,966 B2 | 2/2008 | Dozier | |
| 2002/0032693 A1 | 3/2002 | Chiou et al. | |
| 2002/0087510 A1* | 7/2002 | Weinberg et al. | 707/1 |
| 2002/0174105 A1 | 11/2002 | De La Huerga | |
| 2003/0041305 A1 | 2/2003 | Schnelle et al. | |
| 2003/0135826 A1* | 7/2003 | Dozier | 715/515 |
| 2008/0301074 A1 | 12/2008 | Dozier | |

FOREIGN PATENT DOCUMENTS

| | | |
|---|---|---|
| EP | 0817099 | 1/1998 |
| GB | 2154344 | 9/1985 |
| WO | WO-96/18959 | 6/1996 |
| WO | WO-0043918 A2 | 7/2000 |
| WO | WO-01/22285 | 3/2001 |
| WO | WO-01/33432 | 5/2001 |
| WO | WO-01/35714 | 5/2001 |
| WO | WO 03/060767 * | 7/2003 |
| WO | WO-03060767 A2 | 7/2003 |

WO WO-2005/066848 A1 7/2005

OTHER PUBLICATIONS

Dozier, Christopher, et al., "Combining Record Linkage and Information Extraction to Mine Text." ACM SIGKDD 2003 Workshop on Data Cleaning, Record Linkage, and Object Consolidation. Aug. 2003. pp. 1-2.*
"U.S. Appl. No. 10/171,170, Notice of Allowance mailed Sep. 27, 2007", NOAR,4 pgs.
"U.S. Appl. No. 10/171,170, Final Office Action mailed Feb. 15, 2006", 12 pgs.
"U.S. Appl. No. 10,171,170, Final Office Action mailed Jul. 17, 2007", 11 pgs.
"U.S. Appl. No. 10/171,170, Non Final Office Action mailed May 19, 2005", 15 pgs.
"U.S. Appl. No. 10/171,170, Notice of Allowance mailed Sep. 27, 2007", 4 pgs.
"U.S. Appl. No. 10/171,170, Pre-Appeal Brief Request filed Aug. 15, 2006", 4 pgs.
"U.S. Appl. No. 10/171,170, Preliminary Amendment filed Apr. 24, 2007", 13 pgs.
"U.S. Appl. No. 10/171,170, Response filed Sep. 17, 2007 to Final Office Action mailed Jul. 17, 2007", 8 pgs.
"U.S. Appl. No. 10/171,170, Response filed Oct. 19, 2005 to Non Final Office Action mailed May 19, 2005", 14 pgs.
"U.S. Appl. No. 10/171,170, Response mailed Nov. 24, 2006 to Pre-Appeal Brief Request filed Aug. 15, 2006", 2 pgs.
"U.S. Appl. No. 10/171,170 Final Office Action mailed Jul. 17, 2007", FOAR, 12 pgs.
"International Application Serial No. 02799974.7, European Search Report mailed Sep. 29, 2005", 4 pgs.
"International Application Serial No. PCT/US02/41144, International Preliminary Examination Report mailed Sep. 23, 2004", 15 pgs.
"International Application Serial No. PCT/US02/41144, International Search Report mailed Jun. 29, 2004", 9 pgs.
"International Application Serial No. PCT/US02/41144, Response filed Sep. 6, 2004 to Written Opinion mailed Aug. 6, 2004", 15 pgs.
"International Application Serial No. PCT/US02/41144, Written Opinion mailed Aug. 6, 2004", 6 pgs.
"Introduction to WebFountain: Very Large Scale UnCommon Sense for Text", Powerpoint presentation; Almaden Research Center, San Jose, CA, (Dec. 5, 2003), 31 pages.
"User Generated Hypertext Links", *IBM Technical Disclosure Bulletin*, IBM Corp. NY, vol. 36, No. 10, XP000412443, (Oct. 1993), 453-454.
"WebFountain Application Development Guide, 1st Edition", R. Tretau et al., Eds., Redbooks, (Oct. 2003), 250 pages.
Anonymous, "Multimedia Hyperlinks Automatically Created for Reference Documents", *Research Disclosure*, GB, Industrial Opportunities Ltd., Havant No. 350, XP000372954, (Jun. 1993), 368.
Arents, H. C., "Using SGML on the Web", *Contribution to the SGML BeLux '95 Conference*, http://www.mtm.kuleuven.ac.be/hca/papers/SGML95Conference.html, (Oct. 1995), 8 pages.
Benson, D. , et al., "Multimedia Data Management for Process Control", *International Conference on Multimedia Computing and Systems*, Boston, Mass, (1994), pp. 332-341.
Berners-Lee, T. , et al., "rfc 1738, Uniform Resource Locators (URL)", http://www.cis.ohio-state.edu/htbin/rfc/rfc1738.html, (Dec. 1994), pp. 1-24.
Borgman, C. L., et al., "Getty's Synoname and its Cousins: A Survey of Applications of Personal Name-Matching Algorithms", *Journal of the American Society for Information Science*, American society for Information, 43 (7), (Aug. 1992), 459-476.
Borthwick, A. , "A Maximum Entropy Approach to Named Entity Recognition", *A dissertation submitted in partial fulfillment of the requirements for the degree of Doctor of Philosphy, Computer Science Department, New York University*, (1999), 1-105.
Brill, Eric , "Transformation-Based Error-Driven Learning and Natural Language Processing: A Case Study in Part of Speech Tagging", *Association for Computational Linguistics*, 21 (4), (1995), 1-37.

Bush, Vannevar , "As we may think", *The Atlantic Monthly*, vol. CLXVI, A Magazine of Literature, Science, Art and Politics, (1945), 101-108.
Chase, Victor D., "Made to Order: IBM makes sense of unstructured data", *IBM Think Research*, http://www.research.ibm.com/thinkresearch/pages/2002/20020308_unstructured.shtml, (2002), 6 pages.
Chignell, Mark H., et al., "The Hefti Model of Text to Hypertext Conversion", *Hypermedia*, vol. 3, No. 3, XP000920503, (1991), 187-205.
Dingsoyr, Torgeir , "Bayesian Networks", http://www.idi.ntnu.no/~dingsoyr/dimpoma/node18.html, (Feb. 26, 1998), 3 pages.
Dozier, Christopher , "Assigning Belief Scores to Names in Queries", *Proceedings of Human Language Technologies Conference*, San Diego, California,(2001), 213-218.
Dozier, Christopher , et al., "Automatic Extraction and Linking of Person Names in Legal Text", *Proceedings of RIAO 2000: Content Based Multimedia Information Access*, Paris, France, (Apr. 2000), 1305-1321.
Dozier, Christopher , et al., "Combining Record Linkage and Information Extraction to Mine Text", *ACM SIGKDD 2003 Workshop on Data Cleaning, Record Linkage, and Object Consolidation*, (Aug. 2003), 2 pages.
Golovchinsky, Gene , "What the Query Told the Link: The Integration of Hypertext and Information Retrieval", *ACM Conf. on Hypertext*, US, NY, ACM vol. Conf. 8, XP002116578, (1997), 67-74.
Hsu, L. H., et al., "A Multimedia Authoring-in-the-Large Environment to Support Complex Product Documentation", *Multimedia Tools and Applications 8*, Kluwer Academic Publishers, Netherlands, (1999), pp. 11-64.
Ingham, David , et al., "Fixing the "Broken-Link" problem: the W3Objects approach", *Computer Networks and ISDN Systems*, 28, North Holland Publishing, Amsterdam, NL, (1996), pp. 1225-1268.
Kumar, Ravi , et al., "Extracting large-scale knowledge bases from the web", *Proceedings of the 25th VLDB Conference*, Edinburgh, Scotland, (1999), 12 pages.
Liu, P. , et al., "Towards Automating the Creation of Hypermedia Service Manuals by Compiling Specifications", *International Conference on Multimedia Computing and Systems*, Boston, Mass,(1994), pp. 203-212.
Neidermayer, Daryle , "An Introduction to Bayesian Networks and their Contemporary Applications", http://www.gpfn.sk.ca/~daryle/papers/bayesian_networks/bayes.html, (Dec. 1, 1998), 14 pages.
Newcombe, H. B., "Handbook of Record Linkage", *Oxford University Press*, Oxford, (1988), 4-33.
Page, C. R., "The Nuffield Interactive Book System", *Educational and Training Technology Int'l*, vol. 28, No. 4, XP000920523, (Nov. 1991), 334-340.
Powell, T. A., et al., "URL Formulas", *HTML Programmer's Reference, Osborne/McGraw-Hill, USA, XP002140271*, Osborne/McGraw-Hill, XP002140271, (1998), 364-367.
Rhodes, Bradley J., et al., "A Continuously Running Automated Information Retrieval System", *The Proceedings of The First International Conference on The Practical Application Of Intelligent Agents and Multi Agent Technology*, (1996), 487-495.
Smith, D. A., et al., "Disambiguating Geographic Names in a Historical Digital Library", *Research and Advanced Technology for Digital Libraries. 5th European Conference, ECDL 2001. Proceedings (Lecture Notes in Computer Science*, vol. 2163), *Research and Advanced Technology for Digital Libraries. 5th European Conference, ECDL 2001. Proceedings*, Berlin, Germany, Springer-Verlag, (2001), 127-136.
Winkler, William E., et al., "Machine Learning, Information Retrieval, and Record Linkage", *NISS Workshop on Data Quality*, (Nov. 30, 2000).
Zhang, Nevin L., et al., "Exploiting Causal Independence in Bayesian Network Inference", http://www.cs.ubc.ca/spider/poole/papers/ZhangPoole96/ZhangPoole96.html, (Dec. 6, 1996), 2 pages.
"Multimedia Hyperlinks Automatically Created for Reference Documents", *Research Disclosure*, 350 (9), Kenneth Mason Publications, (Jun. 1993).

Dozier, C., et al., "Automatic Extraction and Linking of Person Names in Legal Text", *Proceedings of RIAO*, (Apr. 2000), 1305-1321.

Dozier, Christopher, et al., "Cross Document Co-Reference Resolution Applications for People in the Legal Domain", *Proceedings of the Workshop on Reference Resolution and Its Applications*, 42nd Meeting of the Association for Computational Linguistics,(Jul. 2004), 8 pages.

Fleischman, Michael B., et al., "Multi-Document Person Name Resolution", *Proceedings of the Workshop on Reference Resolution and Its Applications*, 42nd Meeting of the Association for Computational Liguistics, (Jul. 2004), 8 pages.

Cooper, J. W., et al., "Lexical Navigation: Visually Prompted Query Expansion and Refinement", *Proceedings of the Second ACM International Conference on Digital Libraries*, (Jul. 23, 1997), 237-246.

Cucerzan, S., et al., "Language Independent Named Entity Recognition Combining Morphological Contextual Evidence", *Joint SIGDAT Conference on Empirical Methods in Natural Language Processing and Very Large Corpa.*, (1999), 90-99.

"U.S. Appl. No. 10/171,170, Notice of Allowance mailed Sep. 27, 2007", NOAR,4 pgs.

"U.S. Appl. No. 10/171,170, Final Office Action mailed Feb. 15, 2006", 12 pgs.

"U.S. Appl. No. 10/171,170, Final Office Action mailed Jul. 17, 2007", 11 pgs.

"U.S. Appl. No. 10/171,170, Non Final Office Action mailed May 19, 2005", 15 pgs.

"U.S. Appl. No. 10/171,170, Notice of Allowance mailed Sep. 27, 2007", 4 pgs.

"U.S. Appl. No. 10/171,170, Pre-Appeal Brief Request filed Aug. 15, 2006", 4 pgs.

"U.S. Appl. No. 10/171,170, Preliminary Amendment filed Apr. 24, 2007", 13 pgs.

"U.S. Appl. No. 10/171,170, Response filed Sep. 17, 2007 to Final Office Action mailed Aug. 17, 2007", 8 pgs.

"U.S. Appl. No. 10/171,170, Response filed Oct. 19, 2005 to Non Final Office Action mailed May 19, 2005", 14 pgs.

"U.S. Appl. No 10/171,170, Response mailed Nov. 24, 2006 to Pre-Appeal Brief Request filed Aug. 15, 2006", 2 pgs.

"U.S. Appl. No. 10/171,170 Final Office Action mailed Jul. 17, 2007", FOAR,12 pgs.

"International Application Serial No. 02799974.7, European Search Report mailed Sep. 29, 2005", 4 pgs.

"International Application Serial No. PCT/US02/41144, International Preliminary Examination Report mailed Sep. 23, 2004", 15 pgs.

"International Application Serial No. PCT/US02/41144, International Search Report mailed Jun. 29, 2004", 9 pgs.

"International Application Serial No. PCT/US02/41144, Response filed Sep. 6, 2004 to Written Opinion mailed Aug. 6, 2004", 15 pgs.

"International Application Serial No. PCT/US02/41144, Written Opinion mailed Aug. 6, 2004", 6 pgs.

"International Application Serial No. PCT/US2005/000033, International Preliminary Report on Patentability mailed Aug. 13, 2006", 8 pgs.

"International Application Serial No. PCT/US2005/000033, International Search Report mailed May 25, 2005", 7 pgs.

"International Application Serial No. PCT/US2005/000033, Written Opinion May 25, 2005", 6 pgs.

"Chinese Application Serial No. 02828266.3, Office Action mailed May 30, 2008", 21 pgs.

"Chinese Application Serial No. 200580006189.4, Office Action mailed Mar. 7, 2008", 7 pgs.

"International Application Serial No. 02799974.7, Office Action mailed Oct. 8, 2007", 5 pgs.

"International Application Serial No. 05704881.1, Examiner's Report mailed Aug. 23, 2007", 8 pgs.

"New Zealand Application Serial No. 548804, First Examination Report mailed Apr. 10, 2007", 2 pgs.

"New Zealand Application Serial No. 567455, First Examiner's Report mailed Apr. 17, 2008", 2 pgs.

"European Application Serial No. 02799974.7, Office Action Response of Aug. 5, 2008", 22 pgs.

"Indian Application Serial No. 1043/KOLNP/2004, Office Action mailed Jul. 29, 2008", 2 pgs.

"Indian Application Serial No. 2141/KOLNP/2006, Office Action mailed Oct. 23, 2008", 2 pgs.

"International Application Serial No. 02799974.7, Office Action mailed Oct. 8, 2007", 5 pgs.

"International Application Serial No. 05704881.1, Examiner's Report mailed Aug. 23, 2007", 8 pgs.

"Japanese Application No. 2003-560793, Official Action mailed Oct. 23, 2008", 9 pgs.

"New Zealand Application Serial No. 548804, First Examination Report mailed Apr. 10, 2007", 2 pgs.

"New Zealand Application Serial No. 567455, First Examiner's Report mailed Apr. 17, 2008", 2 pgs.

"Chinese Application No. 02828266.3, Office Action Mailed Dec. 19, 2008", 19 pgs.

\* cited by examiner

*FIG. 3*

DATABASE: PROFILER – PROFILES OF EXPERT WITNESSES　　　　　　　CHANGE DATABASE(S) | TIPS

STANDARD SEARCH | CHOOSE A TEMPLATE: ADVANCED SEARCH ▶

[SEARCH] [CLEAR]
SELECT ONE OR MORE SPECIALTIES FOR ACCIDENT & INJURY

SPECIALTIES

☐ ACCIDENT INVESTIGATIONS & RECONSTRUCTION　☐ HUMAN FACTORS
☐ AEROBICS　☐ INDUSTRIAL ACCIDENTS
☐ ANIMALS　☐ INJURY BIOMECHANICS
☐ APPAREL　☐ LIFE CARE PLANNING
☐ ASBESTOS　☐ LIGHTING
☐ ATHLETICS(FIELDS, COURT & RACKET) INJURIES　☐ LIGHTNING
☐ BOATING　☐ MARINE & MARITIME FORENSIC ACCIDENT & RECONSTRUCTION
☐ BOMBING　☐ OSHA

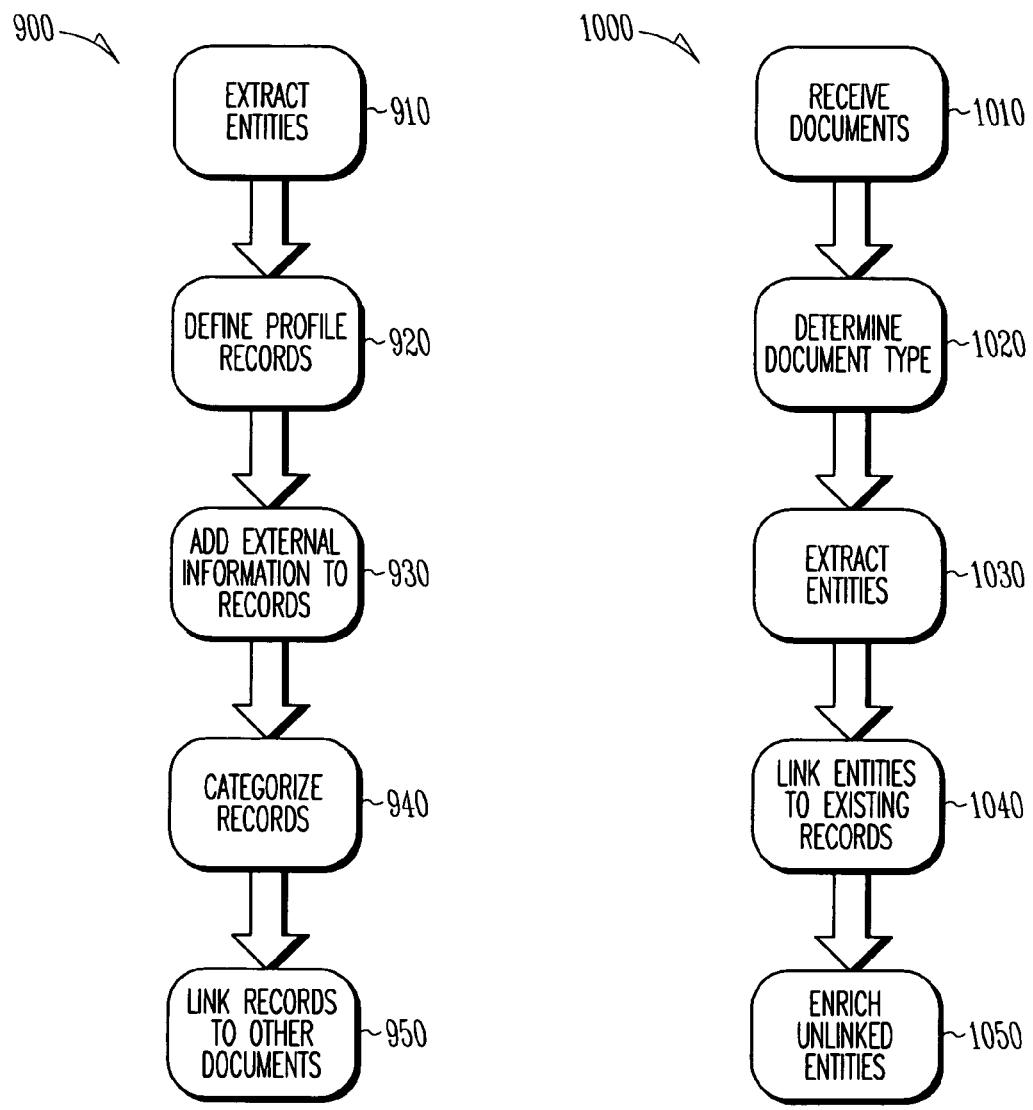
*FIG. 9*    *FIG. 10*

SYSTEMS, METHODS, INTERFACES AND SOFTWARE FOR AUTOMATED COLLECTION AND INTEGRATION OF ENTITY DATA INTO ONLINE DATABASES AND PROFESSIONAL DIRECTORIES

CROSS-REFERENCE TO RELATED APPLICATION

This application claims priority to U.S. provisional application No. 60/533,588 filed on Dec. 31, 2003. The provisional application is incorporated herein by reference.

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright © 2003, Thomson Global Resources AG.

TECHNICAL FIELD

Various embodiments of the present invention concerns information-retrieval systems, such as those that provide legal documents or other related content.

BACKGROUND

In recent years, the fantastic growth of the Internet and other computer networks has fueled an equally fantastic growth in the data accessible via these networks. One of the seminal modes for interacting with this data is through the use of hyperlinks within electronic documents.

More recently, there has been interest in hyperlinking documents to other documents based on the names of people in the documents. For example, to facilitate legal research, West Publishing Company of St. Paul, Minn. (doing business as Thomson West) provides thousands of electronic judicial opinions that hyperlink the names of attorneys and judges to their online biographical entries in the West Legal Directory, a proprietary directory of approximately 1,000,000 U.S. attorneys and 20,000 judges. These hyperlinks allow users accessing judicial opinions to quickly obtain contact and other specific information about lawyers and judges named in the opinions.

The hyperlinks in these judicial opinions are generated automatically, using a system that extracts first, middle, and last names; law firm name, city, and state; and court information from the text of the opinions and uses them as clues to determine whether to link the named attorneys and judges to their corresponding entries in the professional directory. See Christopher Dozier and Robert Haschart, "Automatic Extraction and Linking of Person Names in Legal Text" (Proceedings of RIAO 2000: Content Based Multimedia Information Access. Paris, France. pp. 1305-1321. Apr. 2000), which is incorporated herein by reference. An improvement to this system is described in Christopher Dozier, System, Methods And Software For Automatic Hyperlinking Of Persons' Names In Documents To Professional Directories, WO 2003/060767A3 Jul. 24, 2003.

The present inventors have recognized still additional need for improvement in these and other systems that generate automatic links.

BRIEF DESCRIPTION OF DRAWINGS

FIGS. 3-8 are facsimiles of exemplary user interfaces, each corresponding to one or more embodiments of the invention.

FIG. 9 is a flow chart corresponding to one or more embodiments of the invention.

FIGS. 10 is a flow chart corresponding to one or more additional embodiment of the invention.

DETAILED DESCRIPTION OF EXEMPLARY EMBODIMENTS

This description, which references and incorporates the above-identified Figures, describes one or more specific embodiments of an invention. These embodiments, offered not to limit but only to exemplify and teach the invention, are shown and described in sufficient detail to enable those skilled in the art to implement or practice the invention. Thus, where appropriate to avoid obscuring the invention, the description may omit certain information known to those of skill in the art.

Exemplary Information-Retrieval System

Figure 1:
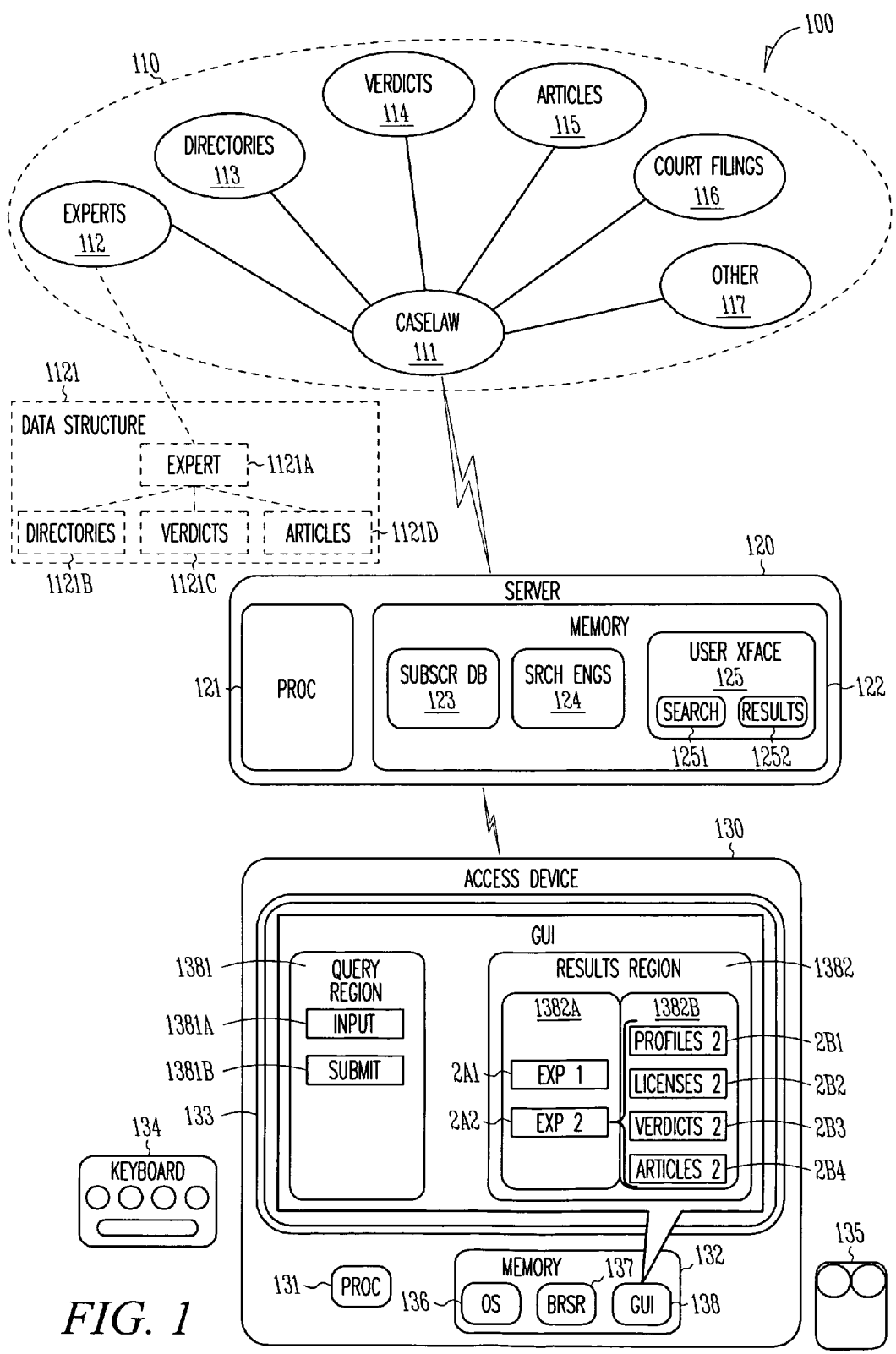
FIG. 1 is a diagram of an exemplary information-retrieval system 100 corresponding to one or more embodiments of the invention.

FIG. 1 shows an exemplary online information-retrieval system 100. System 100 includes one or more databases 110, one or more servers 120, and one or more access devices 130.

Databases 110 include a set of one or more databases. In the exemplary embodiment, the set includes a caselaw database 111, an expert witness directory 112, professional directories or licensing databases 113, a verdict and settlement database 114, an court-filings database 116.

Caselaw database 111 generally includes electronic text and image copies of judicial opinions for decided cases for one or more local, state, federal, or international jurisdiction. Expert witness directory 112, which is defined in accord with one or more aspects of the present invention, includes one or more records or database structures, such as structure 1121. Structure 1121 includes an expert identifier portion 1121A which is logically associated with one or more directory documents or entries 1121B, one or more verdict documents or entries 1121C, and one or more articles 1121D. Some embodiments logically associate the expert identifier with court filings documents, such as briefs and expert reports and/or other documents.

Professional directories or licensing databases 113 include professional licensing data from one or more state, federal, or international licensing authorities. In the exemplary embodiment, this includes legal, medical, engineering, and scientific licensing or credentialing authorities. Verdict and settlement database 114 includes electronic text and image copies of documents related to the determined verdict, assessed damages, or negotiated settlement of legal disputes associated with cases within caselaw database 111. Articles database 115 includes articles technical, medical, professional, scientific or other scholarly or authoritative journals and authoritative trade publications. Some embodiments includes patent publications. Court-filings database 116 includes electronic text and image copies of court filings related to one or more subsets of the judicial opinions caselaw database 111. Exemplary court-filing documents include briefs, motions, complaints, pleadings, discovery matter. Other databases 115 includes one or more other databases containing documents regarding news stories, business and finance, science and technology, medicine and bioinformatics, and intellectual property information. In some embodiments, the logical relationships across documents are determined manually or using automatic discovery processes that leverage information such as litigant identities, dates, jurisdictions, attorney identifies, court dockets, and so forth to determine the existence or likelihood of a relationship between any pair of documents.

Databases 110, which take the exemplary form of one or more electronic, magnetic, or optical data-storage devices, include or are otherwise associated with respective indices (not shown). Each of the indices includes terms and/or phrases in association with corresponding document addresses, identifiers, and other information for facilitating the functionality described below. Databases 112, 114, and 116 are coupled or couplable via a wireless or wireline communications network, such as a local-, wide-, private-, or virtual-private network, to server 120.

Server 120, which is generally representative of one or more servers for serving data in the form of webpages or other markup language forms with associated applets, ActiveX controls, remote-invocation objects, or other related software and data structures to service clients of various "thicknesses." More particularly, server 120 includes a processor 121, a memory 122, a subscriber database 123, one or more search engines 124 and software module 125.

Processor 121, which is generally representative of one or more local or distributed processors or virtual machines, is coupled to memory 122. Memory 122, which takes the exemplary form of one or more electronic, magnetic, or optical data-storage devices, stores subscription database 123, search engines 124, and interface module 125.

Subscription database 123 includes subscriber-related data for controlling, administering, and managing pay-as-you-go- or subscription-based access of databases 110. Subscriber database 123 includes subscriber-related data for controlling, administering, and managing pay-as-you-go or subscription-based access of databases 110.

Search engines 124 provides Boolean or natural-language search capabilities for databases 110.

Interface module 125, which, among, other things defines one or portion of a graphical user interface that helps users define searches for databases 110. Software 125 includes one or more browser-compatible applets, webpage templates, user-interface elements, objects or control features or other programmatic objects or structures. More specifically, software 125 includes a search interface 1251 and a results interface 1252.

Server 120 is communicatively coupled or couplable via a wireless or wireline communications network, such as a local—, wide—, private—, or virtual—private network, to one or more accesses devices, such as access device 130.

Access device 130 is not only communicatively coupled or couplable to server 130, but also generally representative of one or more access devices. In the exemplary embodiment, access device 130 takes the form of a personal computer, workstation, personal digital assistant, mobile telephone, or any other device capable of providing an effective user interface with a server or database.

Specifically, access device 130 includes one or more processors (or processing circuits) 131, a memory 132, a display 133, a keyboard 134, and a graphical pointer or selector 135. Memory 132 stores code (machine-readable or executable instructions) for an operating system 136, a browser 137, and a graphical user interface (GUI) 138. In the exemplary embodiment, operating system 136 takes the form of a version of the Microsoft Windows operating system, and browser 137 takes the form of a version of Microsoft Internet Explorer. Operating system 136 and browser 137 not only receive inputs from keyboard 134 and selector (or mouse) 135, but also support rendering of GUI 138 on display 133. Upon rendering, GUI 138 presents data in association with one or more interactive control features (or user-interface elements). (The exemplary embodiment defines one or more portions of interface 138 using applets or other programmatic objects or structures from server 120.)

Specifically, graphical user interface 138 defines or provides one or more display control regions, such as a query region 1381, and a results region 1382. Each region (or page in some embodiments) is respectively defined in memory to display data from databases 110 and/or server 120 in combination with one or more interactive control features (elements or widgets). In the exemplary embodiment, each of these control features takes the form of a hyperlink or other browser-compatible command input.

More specifically, query region 1381 includes interactive control features, such as an query input portion 1381A for receiving user input at least partially defining a profile query and a query submission button 1381B for submitting the profile query to server 120 for data from, for example, experts database 112.

Results region 1382, which displays search results for a submitted query, includes a results listing portion 1382A and a document display portion 1382B. Listing portion 1382A includes control features 2A1 and 2A2 for accessing or retrieving one or more corresponding search result documents, such as professional profile data and related documents, from one or more of databases 110, such as expert database 112, via server 120. Each control feature includes a respective document identifier or label, such as EXP 1, EXP 2 identifying respective name and/or city, state, and subject-matter expertise data for the corresponding expert or professional.

Display portion 1382B displays at least a portion of the full text of a first displayed or user-selected one of the profiles identified within listing portion 1382A, EXP 2 in the illustration. (Some embodiments present regions 1382A and 1382B as selectable tabbed regions.) Portion 1382B also includes features 2B1, 2B2, 2B3, and 2B4. User selection of feature 2B1 initiates retrieval and display of the profile text for the selected expert, EXP 2; selection of feature 2B2 initiates retrieval and display of licensing data for any licenses or other credentials held by the selected expert or professional image copy of the document displayed in region 1382B in a separate window; selection of feature 2B3 initiates display and retrieval of verdict data related to the expert or professional; and selection of feature 2B4 initiates retrieval and display of articles (from database 115) that are related to, for example authored by, the expert or professional. Other embodiments include additional control features for accessing court-filing documents, such as briefs, and/or expert reports authored by the expert or professional, or even deposition and trial transcripts where the expert or testimony was a participant. Still other embodiments provide control features for initiating an Internet search based on the selected expert and other data and for filtering results such search based on the profile of the expert or professional.

Exemplary Methods of Operation

Figure 2:
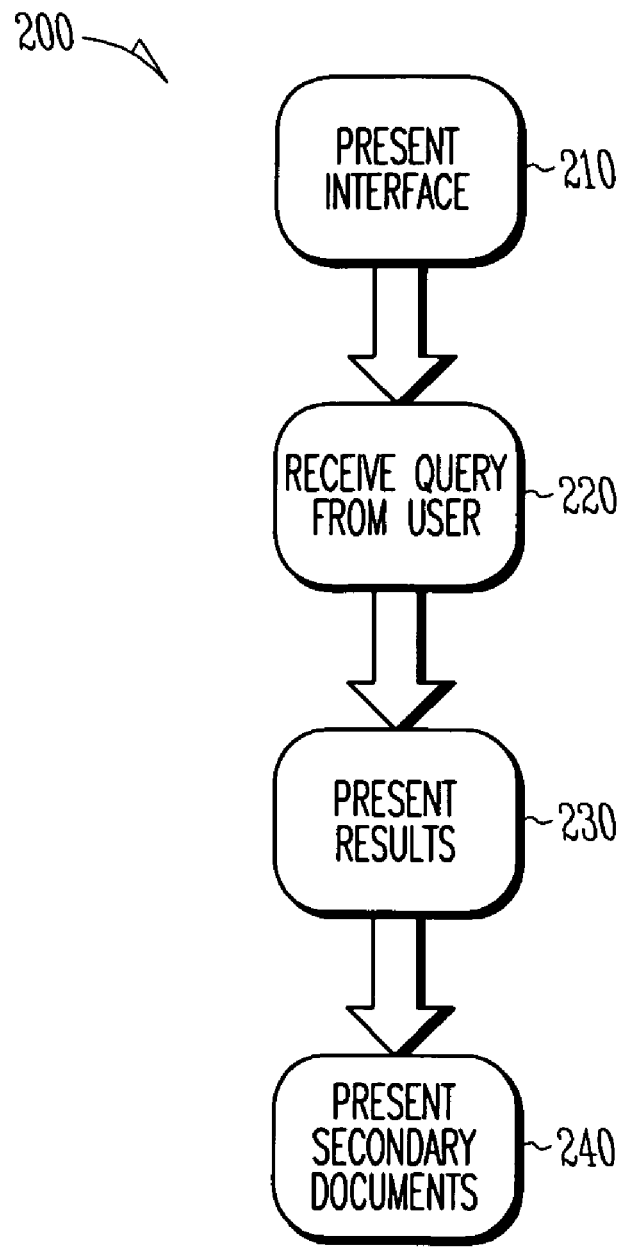
FIG. 2 is a flowchart corresponding to one or more exemplary methods of operating system 100 and one or more embodiments of the invention.

FIG. 2 shows a flow chart 200 of one or more exemplary methods of operating an information-management system, such as system 100. Flow chart 200 includes blocks 210-290, which are arranged and described in a serial execution sequence in the exemplary embodiment. However, other embodiments execute two or more blocks in parallel using multiple processors or processor-like devices or a single processor organized as two or more virtual machines or sub processors. Other embodiments also alter the process sequence or provide different functional partitions to achieve analogous results. For example, some embodiments may alter the client-server allocation of functions, such that functions shown and described on the server side are implemented in whole or in part on the client side, and vice versa. Moreover, still other embodiments implement the blocks as two or more interconnected hardware modules with related control and data signals communicated between and through the modules. Thus, this (and other exemplary process flows in this description) apply to software, hardware, and firmware implementations.

Block 210 entails presenting a search interface to a user. In the exemplary embodiment, this entails a user directing a browser in an client access device to internet-protocol (IP) address for an online information-retrieval system, such as the Westlaw system and then logging onto the system. Successful login results in a web-based search interface, such as interface 138 in FIG. 1 (or one or more portions thereof) being output from server 120, stored in memory 132, and displayed by client access device 130. Execution then advances to block 220.

Figure 3:
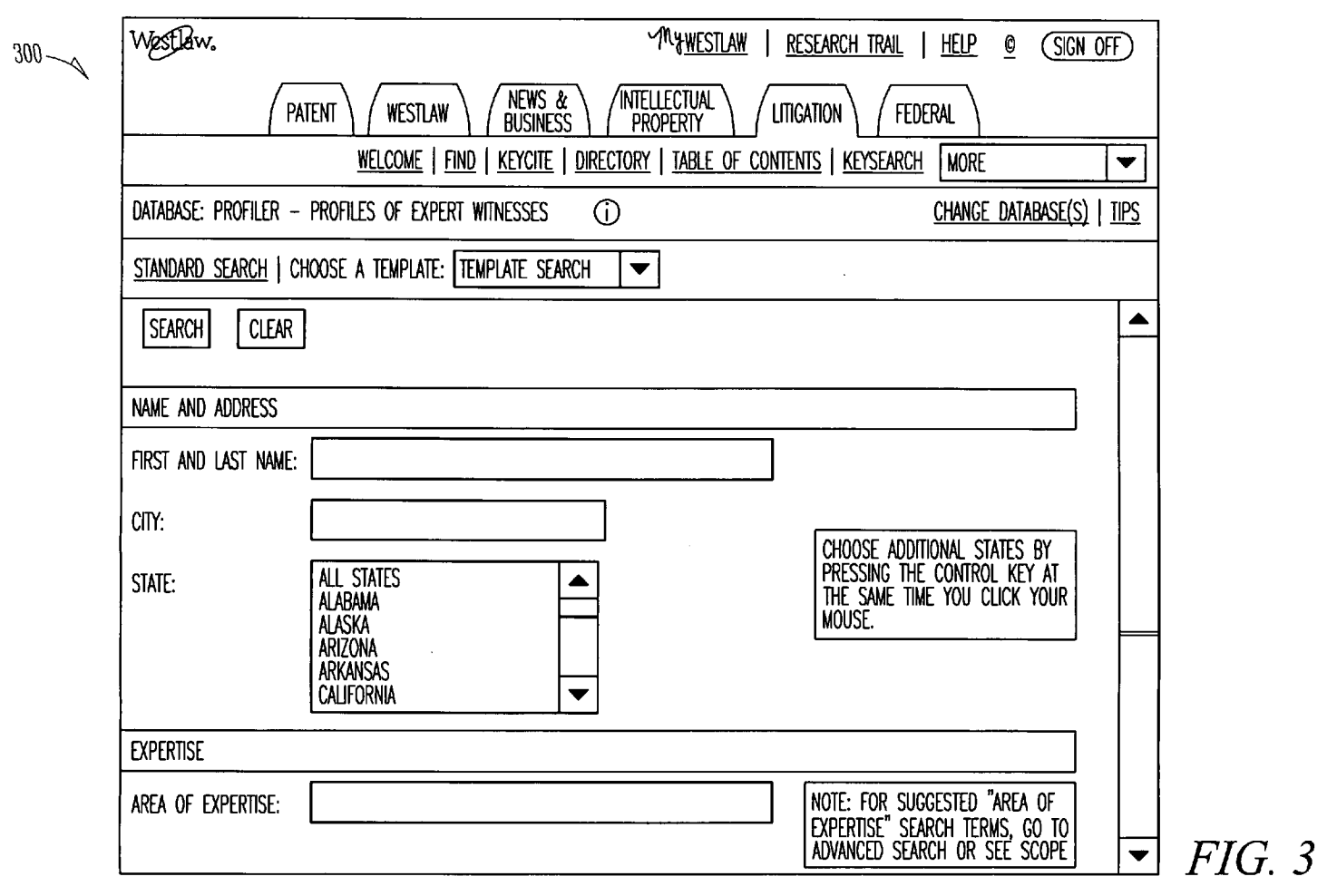

Block 220 entails receipt of a query. In the exemplary embodiment, the query defines one or more attributes of an entity, such as person professional. In some embodiments, the query string includes a set of terms and/or connectors, and in other embodiment includes a natural-language string. Also, in some embodiments, the set of target databases is defined automatically or by default based on the form of the system or search interface. FIGS. 3 and 4 show alternative search interfaces 300 and 400 which one or more embodiments use in place of interface 138 in FIG. 1. Execution continues at block 230.

Figure 5:

Block 230 entails presenting search results to the user via a graphical user interface. In the exemplary embodiment, this entails the server or components under server control or command, executing the query against one or more of databases 110, for example, expert database 110, and identifying documents, such as professional profiles, that satisfy the query criteria. A listing of results is then presented or rendered as part of a web-based interface, such as interface 138 in FIG. 1 or interface 500 in FIG. 5. Execution proceeds to block 240.

Figure 6:
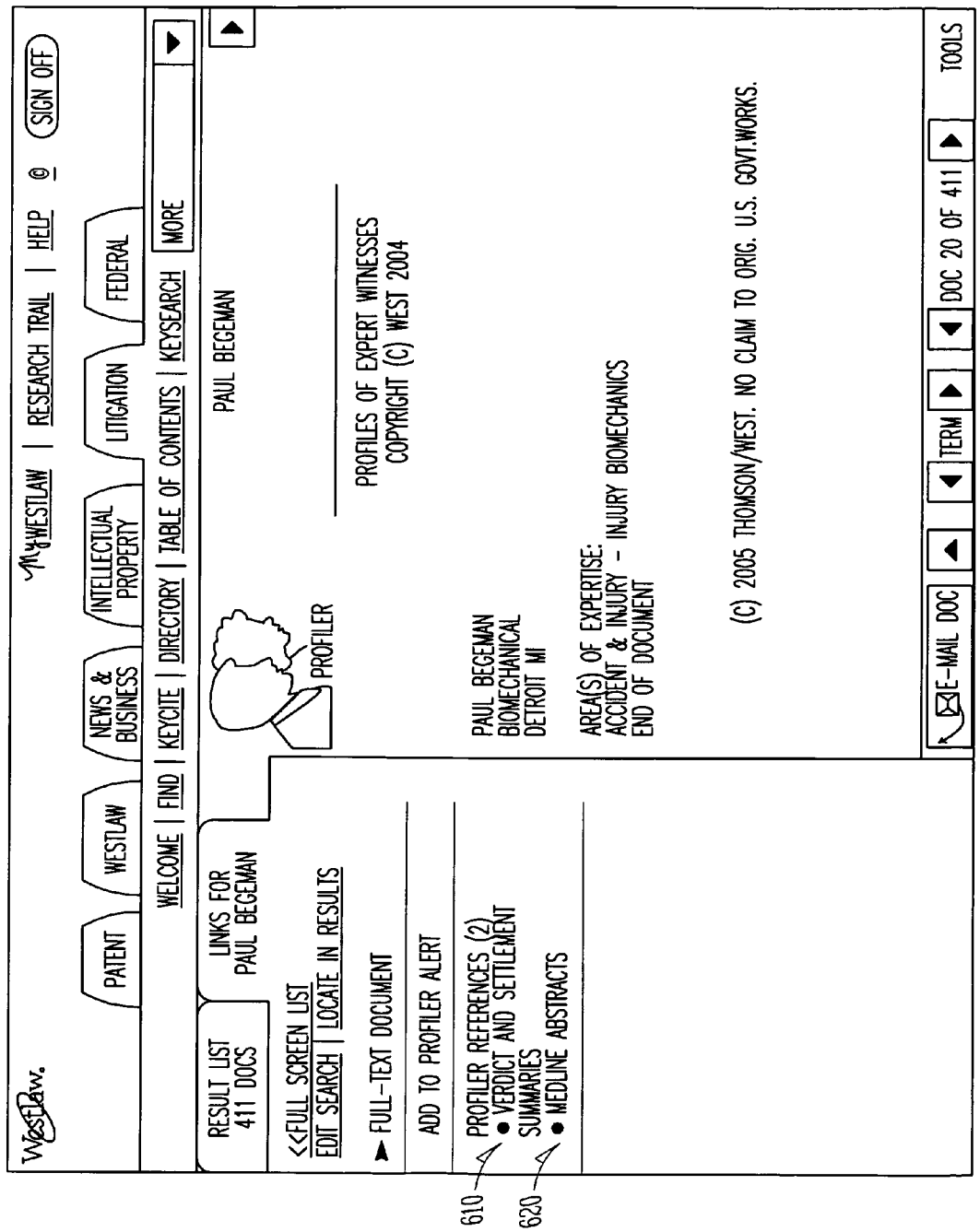
Figure 7:
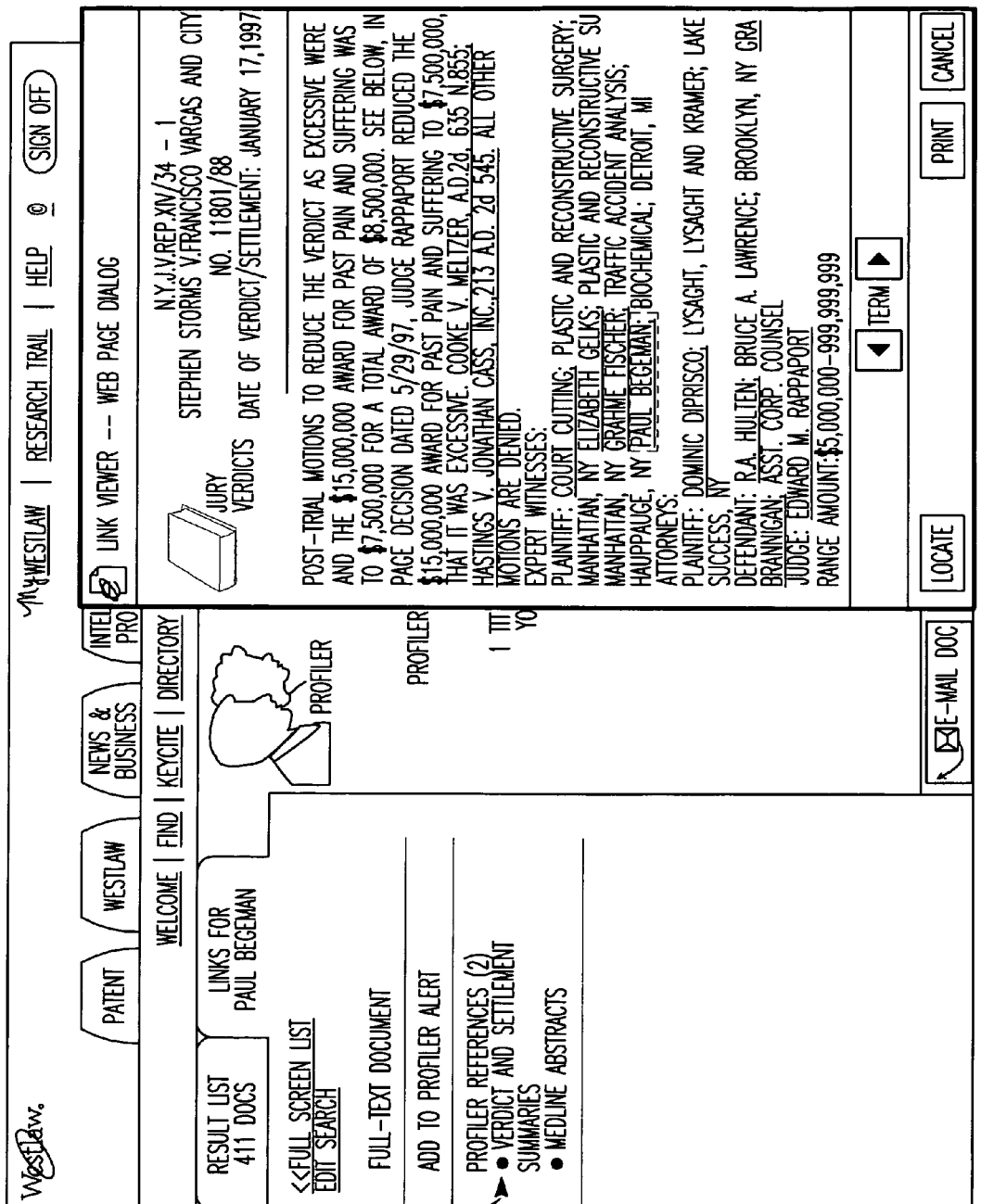
Figure 8:
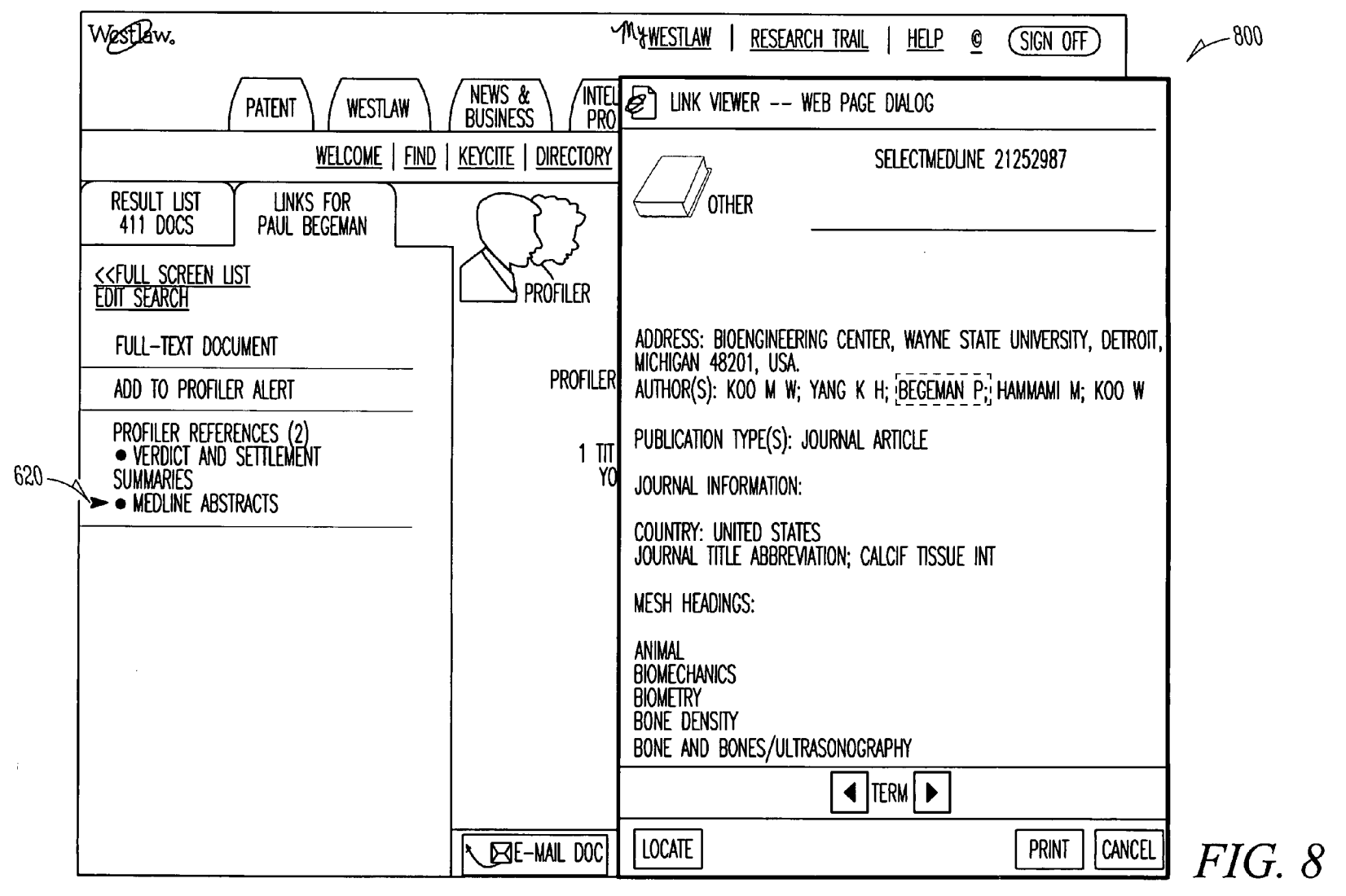

Block 240 entails presenting additional information regarding one or more one or more of the listed professionals. In the exemplary embodiment, this entails receiving a request in the form of a user selection of one or more of the professional profiles listed in the search results. These additional results may be displayed as shown in interface 138 in FIG. 1 or respective interfaces 600, 700, and 800 in FIGS. 6, 7, and 8. Interface 600 shows a listing of links 610 and 620 for additional information related to the selected professional. As shown in FIG. 7, selection of link 610 initiates retrieval and display of a verdict document (or in some case a list of associated verdict documents) in interface 700. And, as shown in FIG. 8, selection of link 620 initiates retrieval and display of an article (or in some cases a list of articles) in interface 800.

Exemplary Method of Building Expert Directory

In FIG. 9, flow chart 900 shows an exemplary method of building an expert directory or database such as used in system 100. Flow chart 900 includes blocks 910-960.

At block 910, the exemplary method begins with extraction of entity reference records from text documents. In the exemplary embodiment, this entails extracting entity references from approximately 300,000 jury verdict settlement (JVS) documents using finite state transducers. JVS documents have a consistent structure that includes an expert witness section or paragraph, such as that exemplified in Table 1.

TABLE 1

| Expert Witness Section of Jury Verdicts and Settlements (JVS) Document |
|---|
| EXPERTS: |
| Plaintiff: |
| Neal Benowitz MD, pharmacologist, UCSF Medical Center, San Francisco.<br>David M. Burns, pulmonologist, UC San Diego, Div. of Pulmonary and Critical Care Medicine, La Jolla.<br>wDefendant:<br>Jerry Whidby PhD., chemist, Philip Morris Co., Richmond, VA. |

The exemplary embodiment uses a parsing program to locate expert-witness paragraphs and find lexical elements (that is, terms used in this particular subject area) pertaining to an individual. These lexical elements include name, degree, area of expertise, organization, city, and state. Parsing a paragraph entails separating it into sentences, and then parsing each element using a separate or specific finite state transducer. The following example displays regular expressions from the finite state transducer used for the organization element. (Variables are prefixed by $.)

$ORG=($UNIVERSITY|$COMPANY|$FIRM ...)
    $UNIVERSITY=($UNIVERSITY1|$UNIVERSITY2)
    $UNIVERSITY1=(University|College ...) (of) [A-Z]
       [a-z]+
    $UNIVERSITY2=([A-Z][a-z]+$SPACE)+
       (University|College ...)

Typically one expert is listed in a sentence along with his or her area of expertise and other information. If more than one expert is mentioned in a sentence, area of expertise and other elements closest to the name are typically associated with that name. Each JVS document generally lists only one expert witness; however, some expert witnesses are references in more than one JVS document. Table 2 shows an example of an entity reference records.

TABLE 2

| Structured Expert-Witness Reference Record Created by Regular Expression Parsers | |
|---|---|
| fname | ARTHUR |
| mname | |
| lname | ABLIN |
| suffix | |
| degree | MD |

TABLE 2-continued

Structured Expert-Witness Reference Record
Created by Regular Expression Parsers

| | |
|---|---|
| org | |
| Expertise | Pediatric hematology/oncology |
| city | SAN FRANCISCO |
| state | CA |

Once the entity reference records are defined, execution continues at block 220.

Block 920 entails defining profile records from the entity reference records: In the exemplary embodiment, defining the profile records entails merging expert-witness reference records that refer to the same person to create a unique expert-witness profile record for the expert. To this end, the exemplary embodiment sorts the reference records by last name to define a number of lastname groups. Records within each "last-name" group are then processed by selecting an unmerged expert reference record and creating an new expert profile record from this selected record.

The new expert reference record is then marked as unmerged and compared to each unmerged reference record in the group using Bayesian matching to compute the probability that the expert in the profile record refers to the same individual referenced in the record. If the computed match probability exceeds a match threshold, the reference is marked as "merged." If unmerged records remain in the group, the cycle is repeated.

Note that it is still possible for duplicate records to reside in the profile file if two or more reference records pertain to one individual (for example, because of a 10 misspelled last name). To address this possibility, a final pass is made over the merged profile file, and record pairs are flagged for manual review. Table 3 shows an exemplary expert profile record created from expert reference records.

TABLE 3

Expert Profile Record Created from Expert Reference Records

| | |
|---|---|
| fname | ARTHUR |
| mname | |
| lname | ABLIN |
| suffix | |
| degree | MD |
| Expertise | Pediatric hematology/oncology |
| Subcat 1 | |
| Subcat 2 | |
| Subcat 3 | |
| category | |
| address | |
| city | SAN FRANCISCO |
| state | CA |

Block 930 entails adding additional information to the expert reference records. In the exemplary embodiment, this entail harvesting information from other databases and sources, such as from professional licensing authorities, telephone directories, and so forth. References to experts in JVS documents, the original entity record source in this embodiment, often have little or no location information for experts, whereas professional license records typically include the expert's full name, and the full current home and/or business address, making them a promising source for additional data.

One exemplary licensing authority is the Drug Enforcement Agency, which licenses health-care professionals to prescribe drugs.

In determining whether a harvested license record (analogous to a reference record) and expert person refer to the same person, the exemplary embodiment computes a Bayesian match probability based on first name, middle name, last name, name suffix, city-state information, area of expertise, and name rarity. If the match probability meets or exceeds a threshold probability, one or more elements of information from the harvested license record are incorporated into the expert reference record. If the threshold criteria is not met, the harvested license record is stored in a database for merger consideration with later added or harvested records. (Some embodiments perform an extraction procedure on the supplemental data similar to that described at block 910 to define reference records, which are then sent as a set for merger processing as in block 910 with the expert reference records.)

TABLE 4

Expert-Profile Record in which Middle Name,
Address, and ZIP-code Fields
Filled or Harvested from Professional License Record

| | |
|---|---|
| fname | ARTHUR |
| mname | R |
| lname | ABLIN |
| suffix | |
| degree | MD |
| org | |
| Expertise | Pediatric hematology/oncology |
| Subcat 1 | pediatrics |
| Subcat 2 | Blood & plasma |
| Subcat 3 | oncology |
| category | Medical & surgical |
| address | 43 Culloden Pk Road |
| city | SAN FRANCISCO |
| state | CA |
| Zip | 94901 |

Block 940 entails categorizing expert profiles by area of expertise. In the exemplary embodiment, each expert witness record is assigned one or more classification categories in an expertise taxonomy. Categorization of the entity records allows users to browse and search expert witness (or other professional) profiles by area of expertise. To map an expert profile record to an expertise subcategory, the exemplary embodiment uses an expertise categorizer and a taxonomy that contains top-level categories and subcategories.

The exemplary taxonomy includes the following top-level categories: Accident & Injury; Accounting & Economics; Computers & Electronics; Construction & Architecture; Criminal, Fraud and Personal Identity; Employment & Vocational; Engineering & Science; Environmental; Family & Child Custody; Legal & Insurance; Medical & Surgical; Property & Real Estate; Psychiatry & Psychology; Vehicles, Transportation, Equipment & Machines. Each categories includes one or more subcategories. For example, the "Accident & Injury" category has the following subcategories: Aerobics, Animals, Apparel, Asbestos, Boating, Bombing, Burn/Thermal, Child Care, Child Safety, Construction, Coroner, Cosmetologists/Beauticians/Barbers/Tattoos, Dog Bites, Entertainment, and Exercise.

Assignment of subject-matter categories to an expert profile record entail using a function that maps a professional descriptor associated with the expert to a leaf node in the expertise taxonomy. This function is represented with the following equation:

$$T = f(S)$$

where T denotes a set of taxonomy nodes, and S is the professional descriptor. The exemplary function fuses a lexicon of 500 four-character sets that map professional descriptors to expertise area. For example, experts having the "onco" professional descriptor are categorized to the oncology specialist, oncologist, and pediatric oncologist subcategories. Other taxonomies are also feasible. The exemplary embodiment allows descriptors to map to more than one expertise area (that is, category or subcategory) in the taxonomy. For example, "pediatric surgeon" can be mapped to both the "pediatrics" node and "surgery" nodes. Table 5 shows an example of an expert profile record in which the expertise field has been mapped to the category "Medical & Surgical" and to the subcategories "pediatrics," "blood & plasma," and "oncology."

TABLE 5

Expert Profile Record with Expertise Area Mapped to "Medical & Surgical"

| | |
|---|---|
| fname | ARTHUR |
| mname | |
| lname | ABLIN |
| suffix | |
| degree | MD |
| org | |
| Expertise | Pediatric hematology/oncology |
| Subcat 1 | pediatrics |
| Subcat 2 | Blood & plasma |
| Subcat 3 | oncology |
| category | Medical & surgical |
| address | |
| city | SAN FRANCISCO |
| state | CA |

Block 940 entails associating one or more text documents and/or additional data sets with one or more of the professional profiles. To this end, the exemplary embodiment logically associates or links one or more JVS documents and/or Medline articles to expert-witness profile records using Bayesian based record matching. Table 6 shows a sample Medline article.

TABLE 6

Sample Text from Medline Article

TITLE: Functional and clinical outcomes of limb-sparing therapy for pediatric extremity sarcomas.
AUTHORS: Bertucio C S; Wara W M; Matthay K K; Ablin A R; Johnston J O; O'Donnell R J; Weinberg V; Haas-Kogan D A
Department of Radiation Oncology, University of California-San Francisco, 505 Parnassus Avenue, San Francisco, CA 94143-0226, USA.
JOURNAL: International journal of radiation oncology, biology, physics (United States)
DATE: Mar. 1, 2001.

To link JVS documents and medline abstracts to expert profile records, expert-reference records are extracted from the articles using one or more suitable parsers through parsing and matched to profile records using a Bayesian inference network similar to the profile-matching technology described previously. For JVS documents, the Bayesian network computes match probabilities using seven pieces of match evidence: last name, first name, middle name, name suffix, location, organization, and area of expertise. For medline articles, the match probability is based additionally on name rarity, as described in the previously mentioned Dozier patent application.

FIG. 10 shows a flow chart 1000 of an exemplary method of growing and maintaining one or more entity directories, such expert database that used in system 100. Flow chart 1100 includes process blocks 1010-1050.

At block 1010, the exemplary method begins with receipt of a document. In the exemplary embodiment, this entails receipt of an unmarked document, such an a judicial opinion or brief. However, other embodiments receive and process other types of documents. Execution then advances to block 1020.

Block 1020 entails determining the type of document. The exemplary embodiments uses one or more methods for determining document type, for example, looking for particular document format and syntax and/or keywords to differentiate among a set of types. In some embodiments, type can be inferred from the source of the document. Incoming content types, such as case law, jury verdicts, law reviews, briefs, etc., have a variety of grammar, syntax, and structural differences. After type (or document description) is determined, execution continues at block 1030.

Block 1030 entails extracting one or more entity reference records from the received document based on the determined type of the document. In the exemplary embodiment, four types of entity records are extracted: personal names, such as attorneys, judges, expert witnesses; organizational names, such as firms and companies; product names, such as drugs and chemicals; and fact profiles ("vernacular" of subject area). Specialized or configurable parsers (finite state transducers), which are selected or configured on the basis of the determined document type and the entity record being built, identify and extract entity information for each type of entity.

Parsers extract information by specifically searching for a named entity (person, address, company, etc.) or by relationships between entities. Parser text-extraction is based on the data's input criteria. For example, the more structured (tagged) data enables a "tighter" set of rules to be built within a parser. This set of rules allows more specific information to be extracted about a particular entity. A more "free" data collection, such as a web site, is not as conducive to rule-based parsers. A collection could also include a combination of structured, semi-structured, and free data. More specifically, parsers are developed through "regular-expression" methods. The regular expressions serves are "rules" for parsers to find entity types and categories of information.

Block 1040 attempts to link or logically associate each extracted entity reference record with one or more existing authority directories. In the exemplary embodiment, this entails computing a Bayesian match probability for each extracted entity reference and one more corresponding candidate records in corresponding directories (or databases) that have been designated as authoritative in terms of accepted accuracy. If the match probability satisfies match criteria, the records are merged or associated and the input document. Execution then proceeds to block 1050.

Block 1050 entails enriching unmatched entity reference records using a matching process. In the exemplary embodiment, this enriching process entails operating specific types of data harvesters on the web, other databases, and other directories or lists, to assemble a cache of new relevant profile information for databases, such as expert database 112 in FIG. 1. The unmatched or unmarked entity records are then matched against the harvested entity records using Bayesian matching. Those that satisfy the match criteria are referred to a quality control process for verification or confirmation prior to addition to the relevant entity directory. The quality control process may be manual, semi-automatic, or fully automatic. For example, some embodiments base the type of quality control on the degree to which the match criteria is exceeded.

In some embodiments, blocks 1050 operates in parallel with blocks 1010-1040, continually retrieving new entity related data using any number of web crawlers, relational databases, or CDs, and attempting to building new entity records.

CONCLUSION

The embodiments described above are intended only to illustrate and teach one or more ways of practicing or implementing the present invention, not to restrict its breadth or scope. The actual scope of the invention, which embraces all ways of practicing or implementing the teachings of the invention, is defined only by the following claims and their equivalents.

The invention claimed is:

1. A hardware system comprising a processor and a memory coupled to the processor and comprising:
   means for extracting one or more entity reference records from documents;
   means for defining one or more entity records by merging one or more of the entity reference records with one or more other entity reference records;
   means for categorizing one or more of the defined entity records based on a taxonomy;
   means for defining links between one or more of the defined entity records and other documents or data sets;
   graphical user interface means for defining a query related to an entity, for viewing one or more documents resulting from the query, and for selecting one or more of the defined links within a legal, financial, healthcare, scientific, or educational document and causing retrieval and display of at least a portion of the one defined entity record; and
   means for defining profile records from the one or more entity reference records, wherein the means for defining the profile records comprises means for merging entity reference records that refer to a same person to create a profile record for that person;
   wherein the means for merging comprises:
      means for sorting the entity reference records by last name;
      means for selecting an unmerged entity reference record and means for creating a profile record from the selected unmerged entity reference record; and
      means for analyzing the unmerged entity reference record for determining a probability that a person in a profile record is the same person as referenced in the selected unmerged entity reference record.

2. The system of claim 1, wherein one or more of the recited means include one or more processors, a tangible computer-readable storage medium, display devices, and network communications, with the tangible computer-readable storage medium including coded instructions and data structures.

3. The system of claim 1, comprising means for categorizing the profile records by expertise of the persons in the profile records.

4. The system of claim 1, wherein the means for analyzing includes Bayesian matching.

5. The system of claim 4, comprising means for marking the entity reference record as merged when a computed match probability exceeds a threshold.

6. The system of claim 1, comprising means for adding information to the entity reference record including means for harvesting information from other databases and sources.

7. The system of claim 6, comprising means for computing a Bayesian match probability means for determining if the harvested information refers to a person of a particular entity reference record.

8. The system of claim 1, comprising:
   means for determining types of the documents; and
   means for extracting one or more entity reference records as a function of the types of the documents.

9. The system of claim 8, wherein the means for determining the types of the documents include means for identifying keywords in the documents.

10. The system of claim 1, wherein the entity reference record includes a personal name record, an organizational name record, a product name record, or a fact profile record.

11. The system of claim 10, comprising means for extracting information from the entity reference record as a function of one or more of a personal name, an organization name, a product name, or a particular fact.

12. A computer-implemented method comprising:
   extracting one or more entity reference records from documents;
   defining one or more entity records by merging one or more of the entity reference records with one or more other entity reference records;
   categorizing one or more of the defined entity records based on a taxonomy;
   defining links between one or more of the defined entity records and other documents or data sets;
   providing network accessible graphical user interface means for defining a query related to an entity, for viewing one or more documents resulting from the query, and for selecting one or more of the defined links within a legal, financial, healthcare, scientific, or educational document and causing retrieval and display of at least a portion of the one defined entity record; and
defining a profile record from the one or more entity reference records, wherein defining the profile record comprises merging entity reference records that refer to a same person to create the profile record for that person;
wherein the merging comprises:
   sorting the entity reference records by last name;
   selecting an unmerged entity reference record and creating a profile record from the selected unmerged entity reference record; and
   analyzing the unmerged entity reference record to determine a probability that a person in a profile record is the same person as referenced in the selected unmerged entity reference record.

13. The computer-implemented method of claim 12, comprising categorizing the profile record by expertise of the person in the profile record.

14. The computer-implemented method of claim 12, wherein the analyzing includes Bayesian matching.

15. The computer-implemented method of claim 12, comprising marking the entity reference record as merged when a computed match probability exceeds a threshold.

16. The computer-implemented method of claim 12, comprising adding information to the entity reference record by harvesting information from other databases and sources.

17. The computer-implemented method of claim 16, comprising computing a Bayesian match probability to determine if the harvested information refers to a person of a particular entity reference record.

18. The computer-implemented method of claim 12, comprising:
   determining types of the documents; and
   extracting one or more entity reference records as a function of the types of the documents.

19. The computer-implemented method of claim 18, wherein the determining the types of the documents includes identifying keywords in the documents.

20. The computer-implemented method of claim 12, wherein the entity reference record includes a personal name record, an organizational name record, a product name record, or a fact profile record.

21. The computer-implemented method of claim 20, comprising extracting information from the entity reference record as a function of one or more of a personal name, an organization name, a product name, or a particular fact.

22. A system comprising:
- a processor configured for extracting one or more entity reference records from documents
- a processor configured for defining one or more entity records by merging one or more of the entity reference records with one or more other entity reference records;
- a processor configured for categorizing one or more of the defined entity records based on a taxonomy;
- a processor configured for defining links between one or more of the defined entity records and other documents or data sets; and
- a graphical user interface processor for defining a query related to an entity, for viewing one or more documents resulting from the query, and for selecting one or more of the defined links within a legal, financial, healthcare, scientific, or educational document and causing retrieval and display of at least a portion of the one defined entity record; and
- a processor configured for defining profile records from the one or more entity reference records, wherein defining the profile records comprises a processor for merging entity reference records that refer to a same person to create a profile record for that person;

wherein the processor for merging comprises:
- a processor configured for sorting the entity reference records by last name;
- a processor configured for selecting an unmerged entity reference record and for creating a profile record from the selected unmerged entity reference record; and
- a processor configured for analyzing the unmerged entity reference record to determine a probability that a person in a profile record is the same person as referenced in the selected unmerged entity reference record.

23. The system of claim 22, comprising a processor configured for categorizing the profile records by expertise of the persons in the profile records.

24. The system of claim 22, wherein the processor configured for analyzing includes Bayesian matching.

25. The system of claim 22, comprising a processor configured for marking the entity reference record as merged when a computed match probability exceeds a threshold.

26. The system of claim 22, comprising a processor configured for adding information to the entity reference record by harvesting information from other databases and sources.

27. The system of claim 26, comprising a processor configured for computing a Bayesian match probability to determine if the harvested information refers to a person of a particular entity reference record.

28. The system of claim 22, comprising:
- a processor configured for determining types of the documents; and
- a processor configured for extracting one or more entity reference records as a function of the types of the documents.

29. The system of claim 28, wherein the processor configured for determining the types of the documents include identifying keywords in the documents.

30. The system of claim 22, wherein the entity reference record includes a personal name record, an organizational name record, a product name record, or a fact profile record.

31. The system of claim 22, comprising a processor configured for extracting information from the entity reference record as a function of one or more of a personal name, an organization name, a product name, or a particular fact.

32. A system comprising:
- one or more processors; and
- a memory coupled to the one or more processors, wherein the memory includes instructions that when executed on the one or more processors execute a process comprising:
- extracting one or more entity reference records from documents;
- defining one or more entity records by merging one or more of the entity reference records with one or more other entity reference records;
- categorizing one or more of the defined entity records based on a taxonomy;
- defining links between one or more of the defined entity records and other documents or data sets; and
- defining a query related to an entity, for viewing one or more documents resulting from the query, and for selecting one or more of the defined links within a legal, financial, healthcare, scientific, or educational document and causing retrieval and display of at least a portion of the one defined entity record;
- defining profile records from the one or more entity reference records, wherein the means for defining the profile records comprises means for merging entity reference records that refer to a same person to create a profile record for that person;

wherein the means for merging comprises:
- means for sorting the entity reference records by last name;
- means for selecting an unmerged entity reference record and means for creating a profile record from the selected unmerged entity reference record; and
- means for analyzing the unmerged entity reference record for determining a probability that a person in a profile record is the same person as referenced in the selected unmerged entity reference record.

* * * * *

UNITED STATES PATENT AND TRADEMARK OFFICE
CERTIFICATE OF CORRECTION

PATENT NO. : 7,571,174 B2
APPLICATION NO. : 11/028464
DATED : August 4, 2009
INVENTOR(S) : Arumainayagam et al.

It is certified that error appears in the above-identified patent and that said Letters Patent is hereby corrected as shown below:

On the Title Pg, Item (73) in "Assignee", line 1, delete "Resurces," and insert -- Resources, --, therefor.

On the Title Pg, in "Primary Examiner", line 1, delete "Shahid A Alam" and insert -- Shahid Al Alam --, therefor.

On the Title Pg, Item (56) on page 3, under "Other Publications", line 64, delete "Philosphy," and insert -- Philosophy, --, therefor.

On the Title Pg, Item (56) on page 3, under "Other Publications", line 2, delete "CLXVI," and insert -- CLXXVI, --, therefor.

On the Title Pg, Item (56) on page 4, under "Other Publications", line 12, delete "Liguistics," and insert -- Linguistics, --, therefor.

On the Title Pg, Item (56) on page 4, under "Other Publications", line 35, delete "Aug." and insert -- Jul. --, therefor.

On the Title Pg, Item (56) on page 4, under "Other Publications", line 8, delete "Aug." and insert -- Jul. --, therefor.

In column 2, line 13, delete "FIGS." and insert -- FIG. --, therefor.

In column 7, line 34, after "a" delete "10".

In column 7, line 47 (Table 3), below "degree" insert -- org --.

UNITED STATES PATENT AND TRADEMARK OFFICE
CERTIFICATE OF CORRECTION

PATENT NO. : 7,571,174 B2
APPLICATION NO. : 11/028464
DATED : August 4, 2009
INVENTOR(S) : Arumainayagam et al.

It is certified that error appears in the above-identified patent and that said Letters Patent is hereby corrected as shown below:

In column 8, line 67, delete "fuses" and insert -- f uses --, therefor.

Signed and Sealed this

Twentieth Day of October, 2009

David J. Kappos
*Director of the United States Patent and Trademark Office*